J. A. MEEKER.
BUTTER FAT GAUGE.
APPLICATION FILED APR. 16, 1921.
1,421,524.
Patented July 4, 1922.
2 SHEETS—SHEET 2.
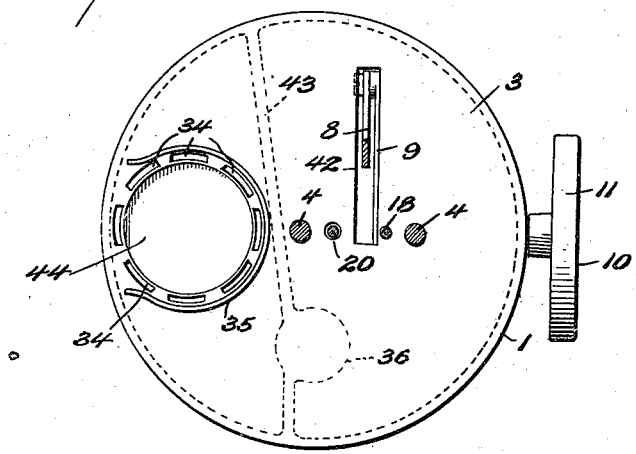
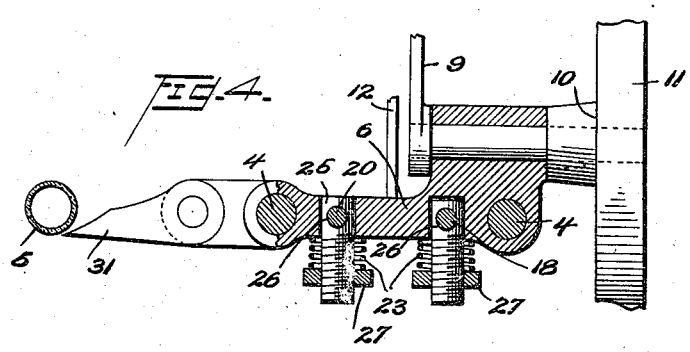
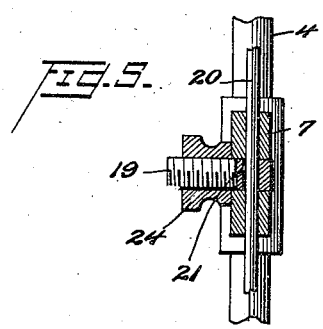
Inventor
John A. Meeker
By John Boyle Jr.
Atty

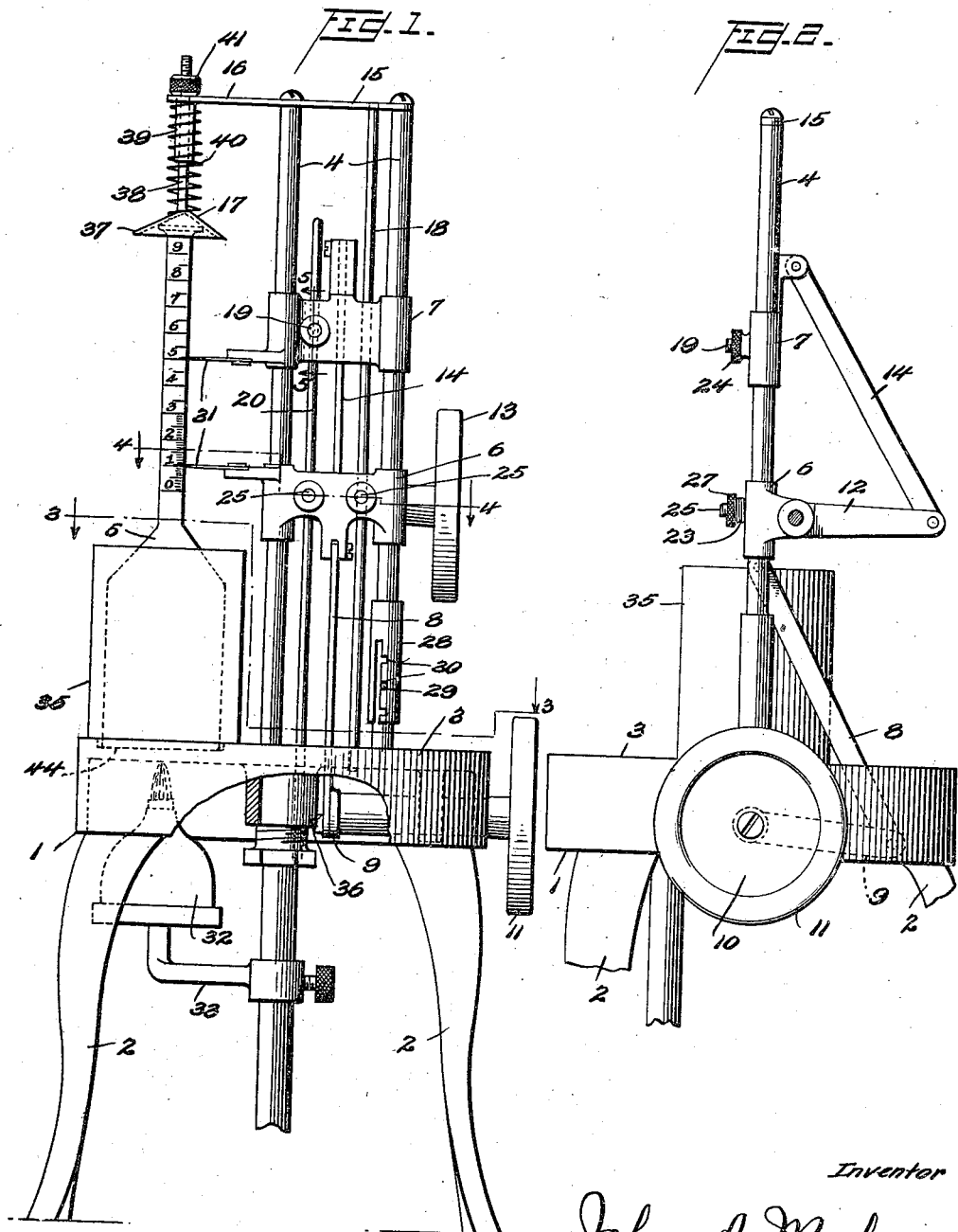

UNITED STATES PATENT OFFICE.

JOHN A. MEEKER, OF POTSDAM, NEW YORK.

BUTTER-FAT GAUGE.

1,421,524.  Specification of Letters Patent.  Patented July 4, 1922.

Application filed April 16, 1921. Serial No. 462,009.

*To all whom it may concern:*

Be it known that JOHN A. MEEKER, citizen of the United States, residing at Potsdam, in the county of St. Lawrence and State of New York, has invented certain new and useful Improvements in Butter-Fat Gauges, of which the following is a specification.

My invention relates to a butter fat gauge and to the same type of machine as disclosed in my Patent No. 1,375,057, granted April 19, 1921, and which is used for reading the calibrated tube of a test bottle to determine the percentage of butter fat in milk and cream. In that device, I have disclosed a gauge provided with a guide, on which reciprocates a member carrying upper and lower pointers and means for setting these pointers at the butter fat level, comprising a crank and pitman motion. It is found that when the lower pointer is moved up to the end of the column of fat and the hand is removed from the adjusting wheel, the pointer does not retain its set position but drops away therefrom, due to lost motion in the adjusting mechanism. One of the objects of the present invention is to provide a construction so that when the pointer is set in position it will not move therefrom due to lost motion. After the lower pointer is set in position and adjustment is being made of the upper pointer, there is also a tendency to throw the lower pointer out of set position. Another object is to provide a construction which will obviate this derangement of the lower pointer.

When the test bottle is removed from the centrifugal machine it is hot from contact with the steam incident to the process of separating. As it rests on the support while being measured, it cools off and the column of fat contracts thus causing a variation in the readings. Another object of the invention is to provide means for maintaining the desired temperature of the test bottle while the layer of fat is being measured.

With these general objects in view, the invention consists in certain novel and peculiar features of construction and combination of parts as hereinafter described and claimed; and in order that it may be fully understood reference is to be had to the accompanying drawings, in which similar reference characters indicate corresponding parts in all the views.

Fig. 1 is an elevation of the machine with a portion broken away;

Fig. 2 is a partial side elevation;

Fig. 3 is a horizontal section on the line 3—3 of Fig. 1;

Fig. 4 is a horizontal section on the line 4—4 of Fig. 1 and

Fig. 5 is a section on the line 5—5 of Fig. 1.

Referring more particularly to the drawings, 1 is a stand or support having legs 2 and a platform 3, on which the test bottle 5 rests, and to which are secured the parallel guide members 4.

Slidably mounted on the guide members are cross heads 6 and 7. Pivotally connected to the cross head 6 intermediate the guides is the pitman 8, which at its other end is pivotally connected to the crank 9, the said crank being mounted in the support 1 to be rotated by the hand wheel 10, which is provided with a wooden rim 11.

Pivotally mounted on the cross head 6 is a crank 12 adapted to be turned by the hand wheel 13, similar in construction to the hand wheel 10. Pivotally connected to said crank and to the cross head 7 intermediate the guides is a pitman 14.

Connecting the guide rods 4 at their upper end is the bar 15 which has an extension 16 to which is secured the stopper 17 for holding the test bottle in adjusted position. Secured to the cross bar 15 at one end and to the support 1 at the other end is an auxiliary guide rod 18. This rod has a free sliding connection with the upper cross head 7 but has a frictional sliding connection with the lower cross head 6.

Adjustably secured to the upper cross head 7 by a clamping screw 19 is another guide rod 20. This rod has a frictional sliding connection with the lower cross head 6 similar to that of the guide rod 18.

The details of the clamping screw connection are shown in Fig. 5 in which the guide rod 20 passes through an aperture 21 in the screw 22, turning of the thumb nut 24 effecting the desired pressure to hold or release the moving parts.

The frictional sliding connections of the cross head 6 on the supplementary guide rods is shown in Fig. 4 and comprises a screw bolt 25, through an aperture 26 in which slides the supplementary guide rods when sufficient force is applied to overcome the friction caused by the pressure of the coil springs 26 interposed between the cross head and the adjusting screws 27.

For limiting the downward movement of the cross head 6 there is provided a vertically adjustable sleeve 28 on one of the rods 4. Adjustment is effected through the medium of the pin 29 engaging the slots 30.

The cross heads are each provided with a pointer 31 which is rotatable in a horizontal plane for adjustment to different sizes of bottle necks.

For maintaining the desired temperature of the test bottle while the layer of separated fat is being gauged, I provide an alcohol lamp 32 adjustably mounted on a bracket 33, suitably connected to the support 1. The platform 3 is provided with a series of slots 34 through which the heated air from the lamp may rise around the bottle to keep it heated. The bottle is also surrounded by a baffle plate 35 to protect the bottle from air drafts. To prevent the heated air from passing up through the slot 42 in which the crank 9 and pitman 8 move, a baffle plate or partition 43 is secured to the under side of the platform 1. While I have shown an alcohol lamp for keeping the test bottle at the desired temperature, other suitable means may be employed as a source of heat, such as a steam coil or electric heater.

Sometimes it may be desirable to support the machine on a wall bracket instead of supporting it on the legs 2; for this purpose there is provided on the under side of the support 1 a bearing 36 for pivotally engaging a suitable supporting bracket.

The adjustable stopper 17 for engaging the mouth of the bottle comprises a flaring member 37 which will readily adapt itself to different sizes of bottle mouths. The member 37 is connected to a rod 38 slidably mounted in the sleeve 39 secured to the extension 16. For adjusting the tension of the spring 40 the upper end of the rod 38 is provided with an adjusting nut and screw 41.

The bottom of the test bottle, in measuring position, fits into a depression 42 in the platform 3.

The operation of my invention is as follows:

The layer of fat having separated out in the calibrated part of the neck of the bottle and it being desired to read the same, the bottle is held in a slightly tilted position, while the mouth of the same is slid under the flaring member 37, the said member moving upwards resiliently to accommodate itself to the movement of the bottle. In measuring position, the bottle is securely held against movement both at the top and bottom thereof.

The hand wheel 10 is then rotated to move the cross head 6 and its attached pointer opposite the lower end of the column of fat. As the cross head 6 moves upwardly for instance, there is sufficient pressure to cause it to slide on the guide rod 18, notwithstanding the friction screw 25. The cross head 7 will also move up in unison with the cross head 6 because there is not sufficient power to cause the cross head 6 to move relatively to the guide rod 20, notwithstanding its friction screw 25, and because the cross head 7 is rigid with the guide rod 20 by means of the clamping screw 21 which is screwed up tight against it.

The result of this arrangement of parts is that when the lower pointer 31 is set opposite the lower fat level it will retain its set position by virtue of the frictional connection between the rod 18 and the cross head 6.

When the upper pointer is adjusted to bring it opposite the upper fat level, by means of the upper hand wheel 13, it is found that this arrangement of parts will not disturb the position of the lower pointer. The mechanics of the forces which produce the state of equilibrium may be explained by the fact, as when the upper pointer is moved upwards, that there is an upward pull on the lower cross head 6 by the rod 20 sliding through its friction bearing which tends to counter balance any downward pressure on the crank pivot.

For limiting and adjusting the upward movement of the upper pointer, the guide rod 20 is moved through the cross head 7 and secured in adjusted position with relation thereto by the set screw 19. Contact of the upper end of the guide rod with the cross bar 15 therefore limits the upward movement of the upper pointer.

Limitations on the downward movement of the lower pointer by means of the sleeve 28 are necessary to prevent the pointers from contacting with the flare of the bottle.

From the above description it will be apparent that I have produced a device of the character described, which possesses all the features enumerated as desirable, and while I have illustrated and described the preferred form of the invention, it will be understood that I reserve the right to all changes properly falling within the scope and spirit of the appended claims.

Therefore what I claim as new and desire to secure by Letters Patent is:

1. A gauge comprising a support, a vertical guide carried thereby, a pointer adapted to reciprocate on the said guide, means for reciprocating the pointer and supplementary means for holding the pointer in set position.

2. A gauge comprising a support, vertical guides carried thereby, a cross head carrying a pointer and adapted to reciprocate on the said guides, a second pointer adjustable with relation to the first pointer, rotary means fixed to the support for adjusting the cross head, and means carried by the cross head for adjusting the second pointer, and supplementary friction means for holding the pointers in set position.

3. A gauge comprising a support, parallel vertical guides carried thereby, a cross head carrying a pointer reciprocating on the said guides, a second cross head reciprocating on the said guides and carrying a second pointer, and a connecting rod between the two cross heads for moving them in unison.

4. A gauge comprising a support, parallel vertical guides carried thereby, a cross head carrying a pointer reciprocating on the said guides, a second cross head reciprocating on the said guides and carrying a second pointer, and a connecting rod between the two cross heads for moving them in unison, the said rod being rigidly secured to one cross head and in frictional sliding engagement with the other.

5. A gauge comprising a support, parallel vertical guides carried thereby, a cross head carrying a pointer reciprocating on the said guides, a second cross head carrying a pointer and reciprocating on the said guides, a connecting rod between the two cross heads for moving them in unison, the said rod having a frictional sliding connection with one of the cross heads.

6. A gauge comprising a support, parallel vertical guides carried thereby, a cross head carrying a pointer reciprocating on the said guides, a second cross head carrying a pointer and reciprocating on the said guides, means for moving the cross heads in unison, and friction means between a cross head and one of the guides for holding the cross head in set position.

7. A gauge comprising a support, parallel vertical guides carried thereby, a cross head carrying a pointer reciprocating on the said guides, a connecting rod rigidly secured to one of the cross heads and having a sliding frictional engagement with the other cross head, the said last cross head having a sliding frictional engagement with one of the said guides.

8. A gauge comprising a support, a guide carried thereby, pointers carried by the said guide, one of the said pointers being adjustable with relation to the other, a test bottle provided with a scale supported in proximity to the said pointers, said pointers adapted to be brought into a position intermediate the ends of the scale, and means for thereafter bringing one of the said pointers in registration with the zero mark on the scale to effect a reading, and supplementary friction means for holding the pointers in set position.

9. A gauge comprising a support for a test bottle, a measuring device in proximity thereto and means for conserving the heated contents of the test bottle.

10. A gauge comprising a support for a test bottle, a measuring device in proximity thereto, means for conserving the heated contents of the test bottle and comprising a baffle plate surrounding the bottle.

11. A gauge comprising a support for a test bottle, a measuring device in proximity thereto, means engaging the neck of the bottle for holding it in measuring position.

12. A gauge comprising a support for a test bottle, a measuring device in proximity thereto and a reciprocatable stopper for engaging the mouth of the bottle for holding it in measuring position.

In testimony whereof I affix my signature.

JOHN A. MEEKER.